United States Patent
Su

(10) Patent No.: US 7,224,754 B2
(45) Date of Patent: May 29, 2007

(54) FREQUENCY OFFSET COMPENSATION ESTIMATION SYSTEM AND METHOD FOR A WIRELESS LOCAL AREA NETWORK

(75) Inventor: Hsiao-Lan Su, Pingtung (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 701 days.

(21) Appl. No.: 10/449,126

(22) Filed: Jun. 2, 2003

(65) Prior Publication Data

US 2004/0240593 A1 Dec. 2, 2004

(51) Int. Cl.
*H04L 27/06* (2006.01)

(52) U.S. Cl. .................. 375/344; 375/362; 375/375; 370/210

(58) Field of Classification Search ............ 375/259, 375/260, 316, 344, 354, 362, 371, 375; 370/208, 370/210

See application file for complete search history.

(56) References Cited

U.S. PATENT DOCUMENTS 6,373,861 B1 * 4/2002 Lee .................. 370/503

| | | | |
|---|---|---|---|
| 2002/0145971 A1 * | 10/2002 | Cho et al. ........... | 370/208 |
| 2003/0058953 A1 * | 3/2003 | Lee et al. ........... | 375/260 |
| 2004/0004934 A1 * | 1/2004 | Zhu et al. ........... | 370/208 |
| 2004/0120410 A1 * | 6/2004 | Priotti ............... | 375/260 |

\* cited by examiner

*Primary Examiner*—Pankaj Kumar
*Assistant Examiner*—Naheed Ejaz
(74) *Attorney, Agent, or Firm*—Troxell Law Office, PLLC

(57) ABSTRACT

A frequency offset compensation estimation system and method for a wireless local area network. First, a preamble sequence of a frequency package is sent to a frequency offset estimation (FOE) device so that an initial frequency offset signal amount is obtained and sent to the frequency offset compensation (FOE) device for compensation. Then, the compensated signal is sent to a frequency offset residual phase estimation (FOS RPE) device so as to calculate an offset amount of the frequency and send it to the frequency offset residual phase compensation (FOS RPC) device for compensation. The present invention mainly employs a residual frequency offset estimation device (Residual FOE device) to estimate the residual frequency offset signal of each of the frequency signals compensated by the frequency compensation device and feedback it to the frequency compensation device for compensation. Therefore, the operation load of the frequency offset residual phase compensation (FOS RPC) device will be reduced so as to improve the operation efficiency of the system.

6 Claims, 5 Drawing Sheets

FREQUENCY OFFSET COMPENSATION ESTIMATION SYSTEM AND METHOD FOR A WIRELESS LOCAL AREA NETWORK

BACKGROUND OF THE INVENTION

1. Field of the Invention

The present invention relates to a frequency offset compensation estimation system and method for a wireless local area network (WLAN), and particularly to a frequency offset estimation (FOE) device and its compensation method for a wireless local area network which can reduce the operation load of the frequency offset residual phase compensation (FOS RPC) device so as to improve the operation efficiency of the system.

2. Description of the Prior Art

Recently, the communication on the wireless local area network (WLAN) is greatly and broadly researched, discussed and applied. In the technology of the WLAN based on the orthogonal frequency division multiplex (OFDM), frequency offset compensation at the wireless receiving end is an important task. Generally, the task is accomplished by sending a preamble sequence of the frequency package to a frequency offset estimation device so as to obtain an initial frequency offset signal amount and send it to the frequency offset compensation device for compensation. Next, the compensated signal is sent to a frequency offset residual phase estimation (FOS REP) device so as to figure out the residual frequency offset and send it to the frequency offset residual phase compensation (FOS RPC) device for performing the phase correction and compensation. However, this method will increase the load of the frequency offset residual phase compensation device so as to reduce the operation efficiency of the whole system.

In order to resolve the mentioned problem of the prior art frequency offset estimation (FOE) device for the wireless local area network, the present invention provides a frequency offset compensation estimation system and its system for a wireless local area network so as to reduce the operation load of the frequency offset residual phase compensation (FOS RPC) device for improving the operation efficiency of the whole system.

SUMMARY OF THE INVENTION

The present invention relates to a frequency offset compensation estimation system and its method for a wireless local area network. It mainly employs a residual frequency offset estimation (Residual FOE) device to estimate the residual frequency offset signal of each of the frequency signals compensated by the frequency compensation device and feedback it to the frequency compensation device for compensation. Therefore, the operation load of the frequency offset residual phase compensation (FOS RPC) device can be reduced so as to improve the operation efficiency of the whole system.

In order to achieve to the objective, a frequency offset compensation estimation system for a wireless local area network according to the invention is installed at a receiving end of a wireless local area network. The inventive system comprises a frequency offset compensation device for correcting and compensating the inputted offset frequency signal; a frequency offset estimation device for receiving the preamble sequence signal received by the receiving end so as to obtain an initial frequency offset signal amount and send it to the frequency offset compensation device for compensation; a frequency offset residual phase estimation device (FOS RPE) for receiving a frequency domain signal transmitted from a quick Fourier transfer device and estimating it so as to obtain a offset phase amount; a frequency offset residual phase compensation (FOS RPC) device for compensating the offset phase amount; a residual frequency offset estimation (Residual FOE) device for estimating the residual frequency offset signal of each of the frequency signals compensated by the frequency compensation device and feedbacking it to the frequency offset compensation device for compensation. Therefore, the operation load of the frequency offset residual phase compensation (FOS RPC) device will be reduced so as to improve the operation efficiency of the whole system.

A frequency offset compensation estimation method for a wireless local area network according to the invention comprises the following steps. First, an initial frequency offset signal amount of a preamble sequence is estimated by a frequency estimation device and sent to a frequency compensation device for compensation. Next, the residual frequency offset signal of each of the frequency offset signals is estimated by a residual frequency offset estimation device. Finally, the residual offset phase amount of the frequency is calculated by a frequency offset residual phase estimation device and sent to the frequency offset residual phase compensation device for compensation so as to accomplish the estimation and compensation for the signals.

BRIEF DESCRIPTION OF THE DRAWINGS

The accompanying drawings, which are incorporated in and form part of the specification in which like numerals designate like parts, illustrate preferred embodiments of the present invention and together with the description, serve to explain the principles of the invention. In the drawings.

DETAILED DESCRIPTION OF THE PREFERRED EMBODIMENT

In a frequency offset compensation estimation system for a wireless local area network according to the present invention, the wireless local area network is a communication technology of a wireless local area network (WLAN) based on the orthogonal frequency division multiplex (OFDM), and the inventive system is installed at the receiving end of the wireless local area network for compensating the frequency offsets when receiving the wireless signals.

Figure 1:
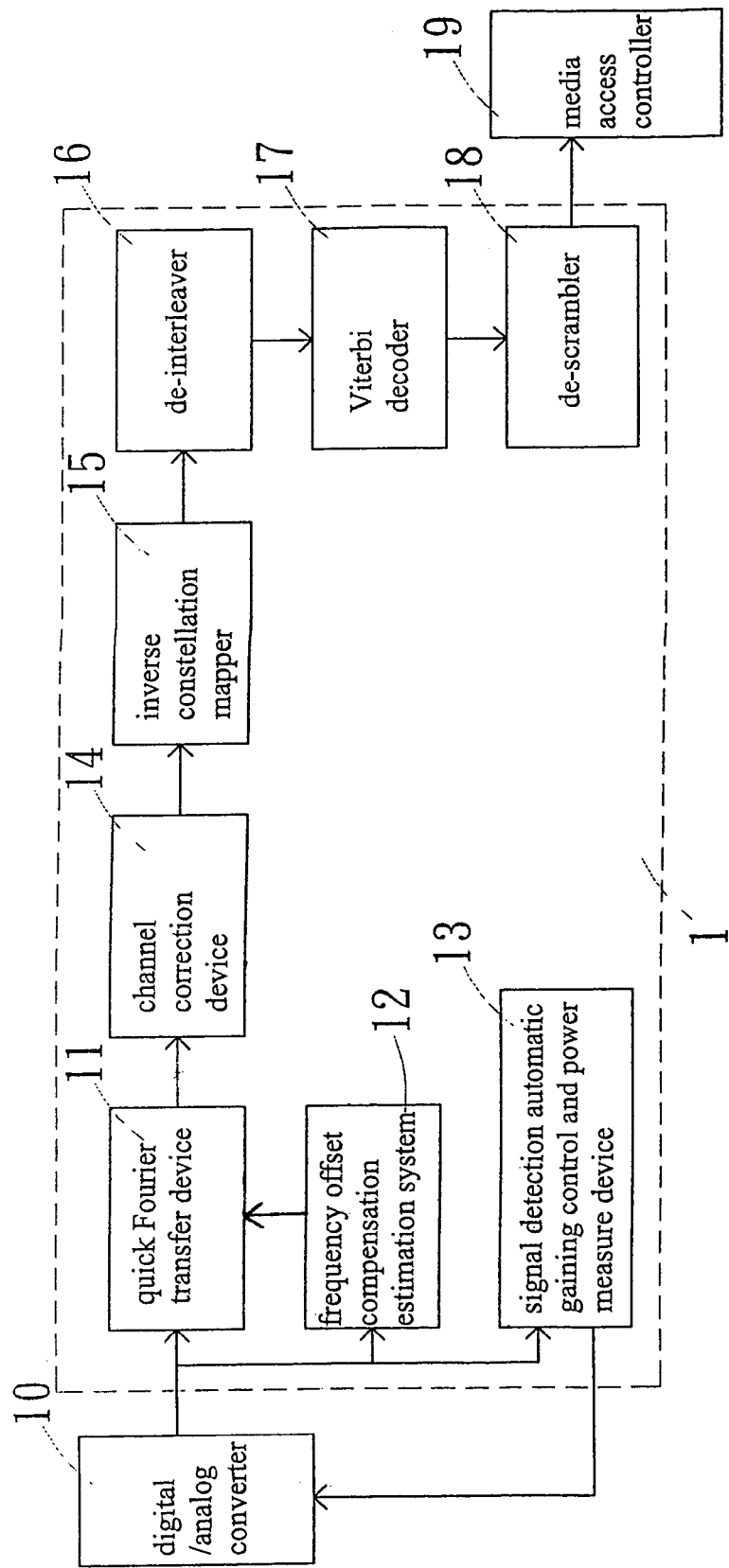
FIG. 1 is a block diagram of a frequency offset compensation estimation system installed in a wireless network receiver according to the present invention.

FIG. 1 is a block diagram of a frequency offset compensation estimation system 23 installed in a wireless network receiver 1 according to the present invention. After the wireless local area network receiver 1 receives a signal, an analog/digital converter (A/D converter) 10 will convert the analog signal into a digital signal. The converted digital signal will be separately outputted to a quick Fourier transfer device 11 for transferring a time domain signal into a frequency domain signal, transmitted to the inventive frequency offset compensation estimation system 23 for estimating the frequency offset, and transmitted to a signal detection automatic gaining control and power measure device 13 for gaining and controlling. The outputted frequency domain signal will be feedback to the frequency offset compensation estimation system 23 for estimating and compensating the residual frequency offset and compensating the phase rotation due to residual frequency offset. Then, the signal is transmitted to a channel correction device 14 for correcting the effect of the compensation channel, and sequentially connected to an inverse constellation mapper 15 for performing de-constellation mapping. A de-interleaver 16 is used for de-interleaving the signal, and then the signal is outputted to a Viterbi decoder 17 for decoding the signal. The decoded signal will be transmitted to a de-scrambler 18 for decoding the signal scrambled in the original emission device. Next, the signal is connected to a media access controller (MAC) 19. As shown in FIG. 1, it is a circuit block diagram of the inventive frequency offset compensation estimation system 23 installed in a wireless network receiver 1.

Figure 2:
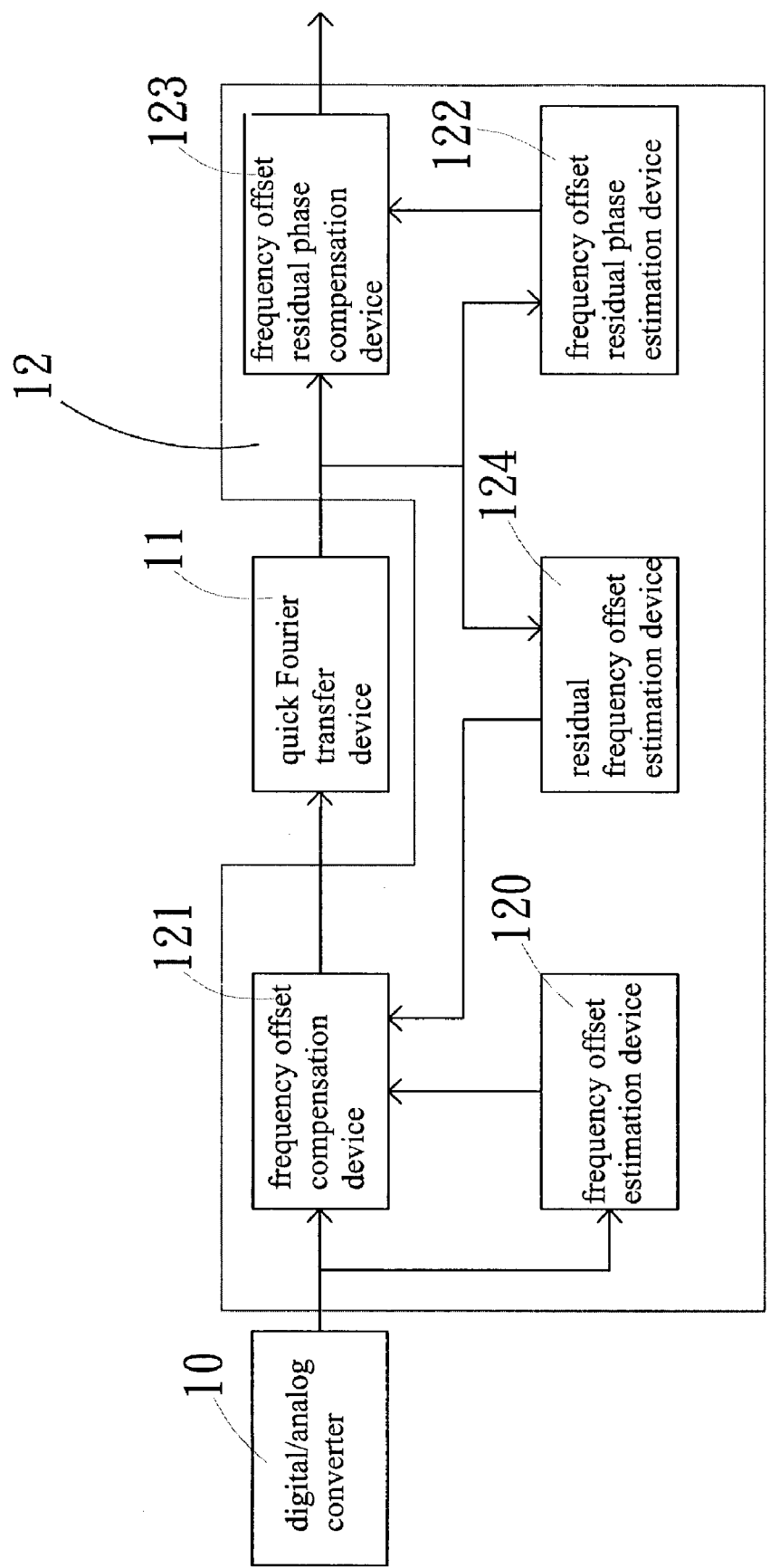
FIG. 2 is a block diagram of a frequency offset compensation estimation system 12 according to the present invention.

FIG. 2 is a block diagram of a frequency offset compensation estimation system 23 according to the present invention. The system 23 comprises a frequency offset estimation device 120, a frequency offset compensation device (FOC) 121, a frequency offset residual phase estimation (FOS RPE) device 122, a frequency offset residual phase compensation (FOS RPC) device 123, and a residual frequency offset estimation (Residual FOE) device 124. The frequency offset estimation device 120 is used for receiving the preamble sequence signal outputted by the A/D converter 10 and figuring out an initial frequency offset signal amount so as to send it to the frequency offset compensation device for compensation. The frequency offset compensation device (FOC) 121 is used for correcting and compensating the inputted offset frequency signal. The frequency offset residual phase estimation (FOS RPE) device 122 is used for receiving the frequency domain signal transmitted form a quick Fourier transfer device 11 and estimating the offset phase rotation amount. The frequency offset residual phase compensation (FOS RPC) device 123 is used for compensating the offset phase amount. The residual frequency offset estimation (Residual FOE) device 124 is used for estimating the residual frequency offset signal of each of the frequency signals compensated by the frequency offset compensation device 121 and feedbacking it to the frequency offset compensation device 121 for compensation. This will reduce the operation load of the frequency offset residual phase compensation (FOS RPC) device 123 so as to improve the operation efficiency of the system.

Figure 3:
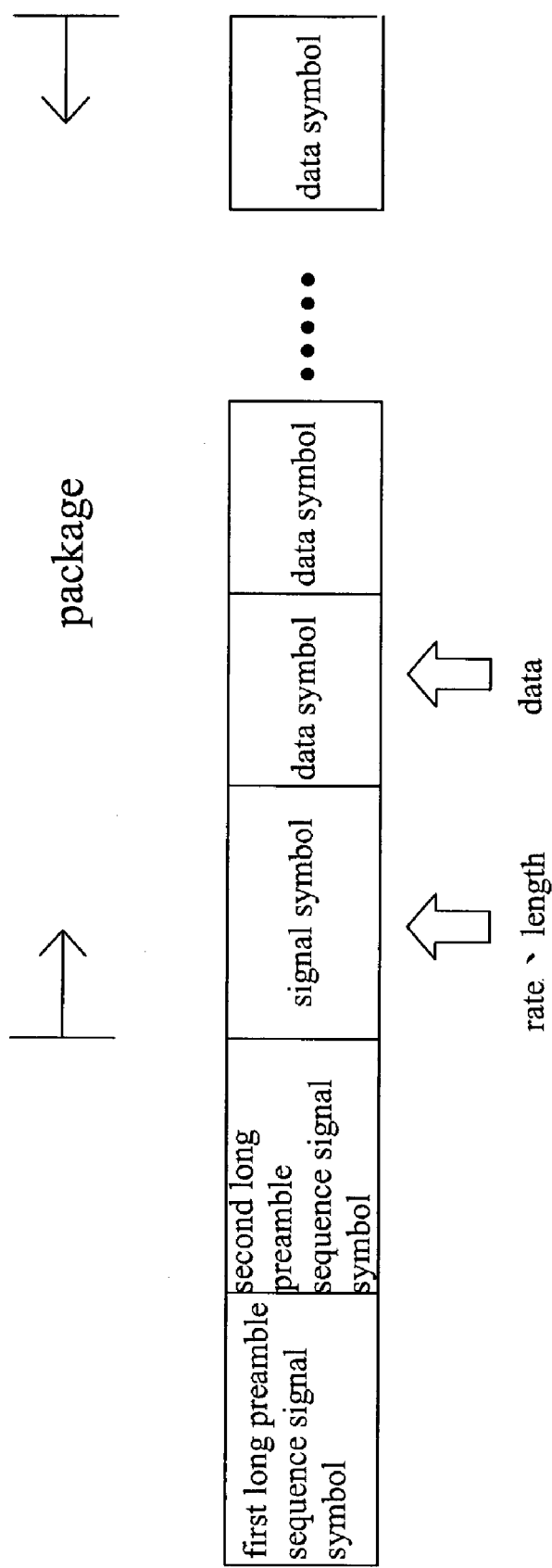
FIG. 3 is a perspective diagram of a transmission package in the wireless local area network according to the present invention.

FIG. 3 is a perspective diagram of a transmission package in the wireless local area network according to the present invention. The package comprises two long preamble sequence signal packages 30, a signal package 31 having the data of the transmission rate, the length and the like, and several data packages 32.

In the present invention, the compensation method is described as follows.

Figure 4A:
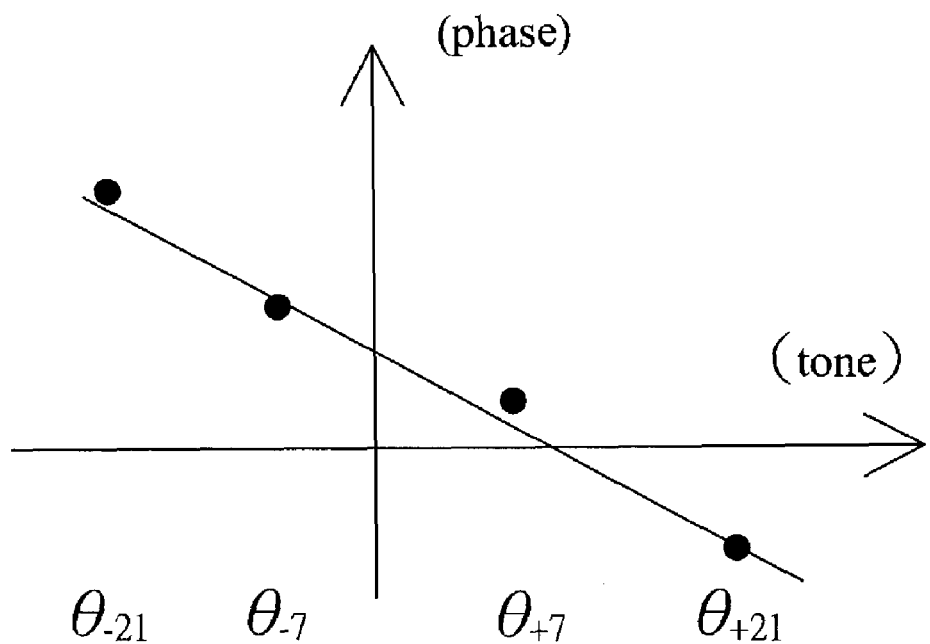
FIG. 4A is a perspective diagram of the average phase of two long preamble sequence signals.

FIG. 4A is a perspective diagram of the average phase of two long preamble sequence signals. The X axle represents the tone, and the Y axle represents the phase. In the embodiment, four pilot tone phases are sampled and the phase $\epsilon_L$ calculation formula is as the following:

$$\text{phase } \epsilon_L = (\theta_{-21} + \theta_{-7} + \theta_{+7} + \theta_{+21}) \tag{1}$$

Figure 4B:
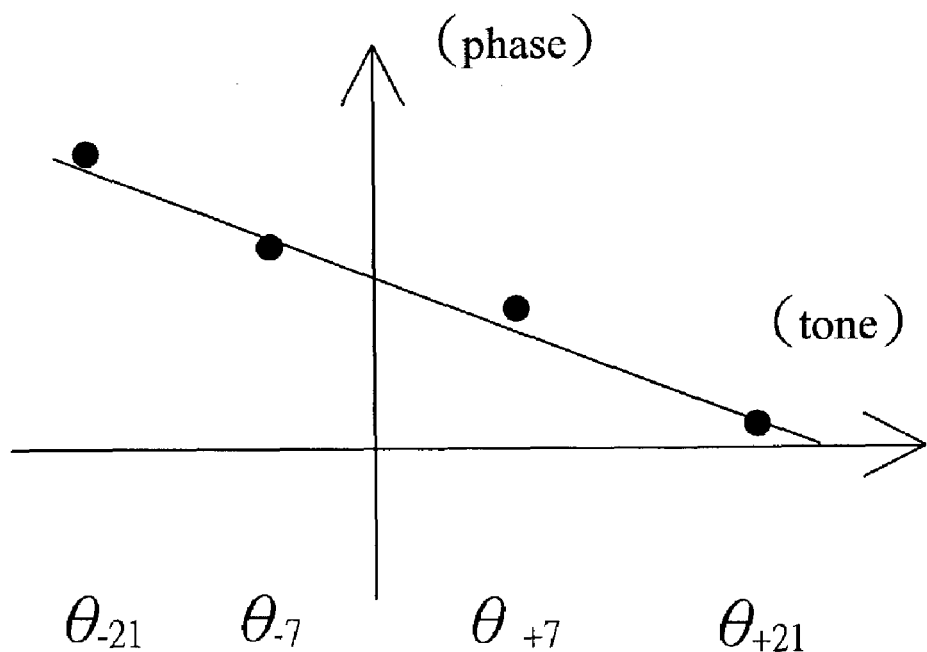
FIG. 4B is a perspective diagram of the phase of each of the data symbols.

FIG. 4B is a perspective diagram of the phase of each of the data symbols. The X axle represents the tone, and the Y axle represents the phase. In this embodiment, four pilot tones are sampled and the phase $\epsilon_L$ calculation formula is as the following:

$$\text{phase } \epsilon_i = (\theta_{-21} + \theta_{-7} + \theta_{+7} + \theta_{+21}) \tag{2}$$

The calculation formula of the phase rotation of each data is as the following:

$$\text{Phase rotation} = \epsilon_i - \epsilon_L \tag{3}$$

If the calculated window length of the residual offset frequency is L, then the average phase rotation $\epsilon_{avg}$ is:

$$\varepsilon_{avg} = \frac{1}{L} \sum_{i=1}^{L} \varepsilon_i - \varepsilon_L \text{ while } \varepsilon_0 - \varepsilon_L \tag{4}$$

After the L signals, the feedback frequency offset compensation size $$(\text{feedback step size}) = -\frac{\varepsilon_{avg}}{80}$$

Figure 5:
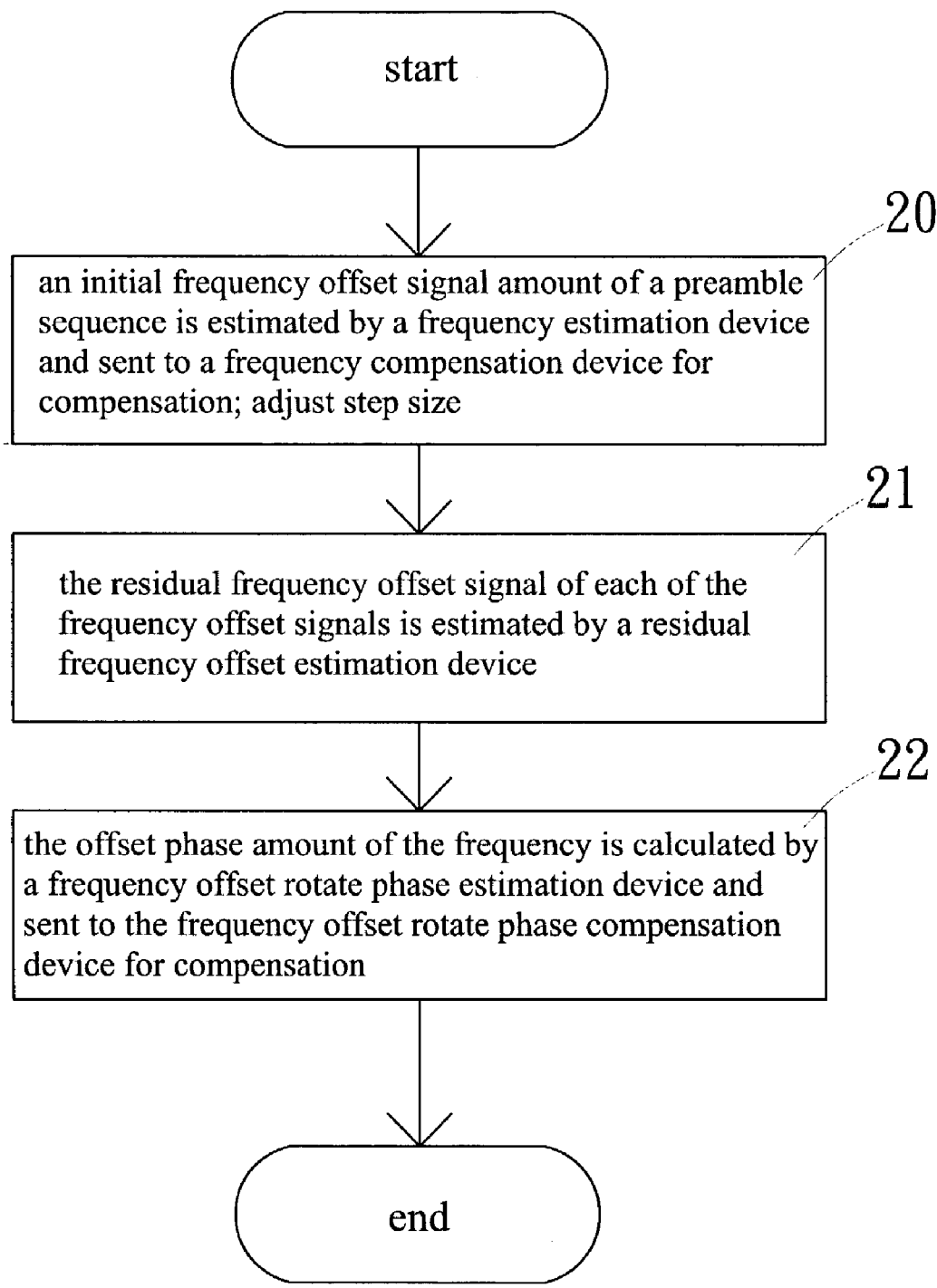
FIG. 5 is a flowchart of a frequency offset compensation estimation method according to the present invention.

FIG. 5 is a flowchart of a frequency offset compensation estimation method according to the present invention. The method comprises the following steps.

First, in the step 20, an initial frequency offset signal amount of a preamble sequence is estimated by a frequency estimation device and sent to a frequency compensation device for compensation. Next, in the step 21, the residual frequency offset signal of each of the frequency offset signals is estimated by a residual frequency offset estimation device. The estimated step size feedback to 20. Finally, in the step 22, the offset phase amount of the frequency is calculated by a frequency offset residual phase estimation device and sent to the frequency offset residual phase compensation device for compensation so as to accomplish the estimation and compensation for the signals.

The above is the detailed description of the frequency offset compensation estimation system and its method for the wireless local area network according to the present invention, the invention mainly employs a residual frequency offset estimation device (Residual FOE device) to estimate the residual frequency offset signal of each of the frequency signals compensated by the frequency compensation device and feedback it to the frequency compensation device for compensation. Therefore, the operation load of the frequency offset residual phase compensation (FOS RPC) device will be reduced so as to improve the operation efficiency of the system.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A frequency offset compensation estimation system in a computer readable medium encoded with software being capable of being executed by a computer for a wireless local area network comprising:

a frequency offset compensation device for correcting and compensating an inputted frequency offset signal and outputting a compensated offset signal, and then outputting the compensated offset signal to a quick Fourier transfer device located at a receiving end of the network so as to transfer the compensated offset signal into a time domain signal;

a frequency offset estimation device for receiving a preamble sequence signal received by the receiving end and outputting an initial frequency offset signal amount to the frequency offset compensation device for compensation;

a frequency offset residual phase estimation (FOS RPE) device for receiving the time domain signal from the quick Fourier transfer device and generating an offset phase amount;

a frequency offset residual phase compensation (FOS RPC) device for compensating the offset phase amount;

a residual frequency offset estimation (Residual FOE) device for generating a residual frequency offset signal of the time domain signal and feedbacking the residual frequency offset signal to the frequency offset compensation device for compensation; and a processor for receiving the Residual FOE.

2. A frequency offset compensation estimation system of claim 1, wherein the frequency offset compensation estimation system is installed in a receiver of a wireless local area network.

3. A frequency offset compensation estimation system of claim 1, wherein the wireless local area network is a wireless local area network based on the orthogonal frequency division multiplex (OFDM).

4. A frequency offset compensation estimation system of claim 2, wherein the input end of the frequency offset compensation estimation system is connected to the output ends of a digital/analog converter and a quick Fourier transfer device.

5. A frequency offset compensation estimation system of claim 4, wherein the receiver comprises:

a signal detection automatic gaining control and power measure device for gaining and controlling;

a channel correction device for correcting the effect of the compensation channel;

an inverse constellation mapper for performing the de-constellation mapping;

a de-interleaver for de-interleaving the signal;

a Viterbi decoder for decoding the signal;

a de-scrambler for decoding the signal scrambled in an emission device; and a media access controller for receiving the decoded signal.

6. A frequency offset compensation estimation method on a computer readable medium encoded with software being capable of being executed by a computer for a wireless local area network comprising:

estimating an initial frequency offset signal amount of a preamble sequence by a frequency estimation device and sending the initial frequency offset signal amount to a frequency compensation device for compensation;

estimating a residual frequency offset signal derived from the initial frequency offset signals by a residual frequency offset estimation device;

calculating an offset phase amount of the frequency by a frequency offset residual phase estimation device according to a frequency domain signal transmitted from a quick Fourier transfer device and sending the offset phase amount to a frequency offset residual phase compensation device for compensation so as to accomplish the estimation of the residual frequency offset signal and the compensation step of calculating an offset phase amount of the frequency by a frequency offset residual phase estimation device for the signals; and outputting the compensated signal to a processor.

* * * * *